United States Patent
Barnett et al.

(10) Patent No.: US 11,125,525 B2
(45) Date of Patent: Sep. 21, 2021

(54) MODULAR QUICK-CHANGE SHOOTING PLATFORM FEET

(71) Applicant: KNS Precision, Inc., Fredericksburg, TX (US)

(72) Inventors: Thomas Clauis Barnett, Kerrville, TX (US); Christian Kager Welch, Fredericksburg, TX (US); Daniel Earl Fisher, Fredericksburg, TX (US)

(73) Assignee: KNS Precision, Inc., Fredericksburg, TX (US)

( * ) Notice: Subject to any disclaimer, the term of this patent is extended or adjusted under 35 U.S.C. 154(b) by 0 days.

(21) Appl. No.: 16/800,205

(22) Filed: Feb. 25, 2020

(65) Prior Publication Data

US 2020/0300573 A1  Sep. 24, 2020

Related U.S. Application Data

(60) Provisional application No. 62/817,252, filed on Mar. 12, 2019.

(51) Int. Cl.
| | |
|---|---|
| *F41A 23/02* | (2006.01) |
| *F41A 23/04* | (2006.01) |
| *F41A 23/08* | (2006.01) |
| *F41A 23/12* | (2006.01) |

(52) U.S. Cl.
CPC .............. *F41A 23/02* (2013.01); *F41A 23/04* (2013.01); *F41A 23/08* (2013.01); *F41A 23/12* (2013.01); *F16B 2200/10* (2018.08)

(58) Field of Classification Search
CPC .......... F41A 23/00; F41A 23/04; F41A 23/06; F41A 23/08; F41A 23/10; F41A 23/12; F41A 23/14; F16B 2200/10
USPC ................................................ 42/94; 403/361
See application file for complete search history.

(56) References Cited

U.S. PATENT DOCUMENTS

| | | | | |
|---|---|---|---|---|
| 1,107,805 | A * | 8/1914 | Lewis ...................... | F41A 23/04 89/40.06 |
| 2,263,850 | A * | 11/1941 | Nielsen ................... | F16N 21/04 285/102 |
| 2,696,392 | A * | 12/1954 | Case ....................... | B60D 1/065 280/513 |
| 2,784,987 | A * | 3/1957 | Corcoran .............. | F16L 37/133 285/82 |
| 2,807,904 | A * | 10/1957 | Kreske ................... | F41A 23/08 42/94 |
| 3,347,293 | A * | 10/1967 | Clark .................. | B25B 23/0035 81/438 |
| 3,407,454 | A * | 10/1968 | Myatt ..................... | F16B 21/02 411/549 |
| 3,655,226 | A * | 4/1972 | Cowan ................... | F16C 21/00 403/165 |

(Continued)

*Primary Examiner* — Derrick R Morgan
(74) *Attorney, Agent, or Firm* — Wood Herron & Evans LLP

(57) ABSTRACT

Provided is a foot attachment adapter for a firearm support device having at least one leg. The adapter includes a body configured to attach to a leg of a firearm support device and a socket. A foot having has an attachment portion that is configured to be detachably received by the socket. A temporarily deformable elastomeric member is positioned at least partially in the socket to allow insertion of the foot portion and to releasably hold the attachment portion in the socket.

2 Claims, 6 Drawing Sheets

(56) References Cited

U.S. PATENT DOCUMENTS

| | | | | |
|---|---|---|---|---|
| 3,667,785 A | * | 6/1972 | Kapeker | F16L 41/02 285/231 |
| 3,675,959 A | * | 7/1972 | Hansen | E05C 17/52 292/70 |
| 3,707,303 A | * | 12/1972 | Petri | F16B 21/165 403/328 |
| 3,829,153 A | * | 8/1974 | Fussell, Jr. | B60J 1/20 296/90 |
| 3,874,706 A | * | 4/1975 | Arnold | F16L 19/08 285/24 |
| 3,935,657 A | * | 2/1976 | Wade | F41A 23/00 42/94 |
| 4,085,916 A | * | 4/1978 | Pedersen | F16B 12/32 248/188 |
| 4,266,883 A | * | 5/1981 | Riester | F16C 11/0695 403/134 |
| 4,361,930 A | * | 12/1982 | Seesengood | B60B 33/0002 16/38 |
| 4,535,658 A | * | 8/1985 | Molinari | B25B 23/0035 81/177.85 |
| 4,565,350 A | * | 1/1986 | Rozek | F16K 31/60 251/292 |
| 4,625,620 A | * | 12/1986 | Harris | F41A 23/08 42/94 |
| 4,671,543 A | * | 6/1987 | Miliczky | F16L 27/04 285/270 |
| 4,781,487 A | * | 11/1988 | Greco | F16B 19/02 285/321 |
| 4,813,810 A | * | 3/1989 | Suzuki | F16D 3/387 403/322.2 |
| 4,915,351 A | * | 4/1990 | Hoffman | F16L 37/23 251/149.1 |
| 4,932,431 A | * | 6/1990 | Silagy | F16L 37/23 137/174 |
| 5,019,105 A | * | 5/1991 | Wiley | A61F 2/4637 623/22.29 |
| 5,083,818 A | * | 1/1992 | Schoot | F16L 37/084 285/304 |
| 5,274,940 A | * | 1/1994 | Guzy | F16M 11/08 42/94 |
| 5,335,947 A | * | 8/1994 | Remsburg | F16L 37/23 285/267 |
| 5,351,586 A | * | 10/1994 | Habermehl | B25B 13/06 81/438 |
| 5,438,786 A | * | 8/1995 | Hilderbrand | F41A 23/14 248/171 |
| 5,443,323 A | * | 8/1995 | Prelat | B60Q 1/0683 403/289 |
| 5,518,335 A | * | 5/1996 | Dobbins | F41A 3/46 403/328 |
| 5,540,250 A | * | 7/1996 | Mullins | F16L 55/1015 137/75 |
| 5,903,995 A | * | 5/1999 | Brubach | F41A 23/06 42/90 |
| 5,947,249 A | * | 9/1999 | Tobiasz | B60K 23/02 192/85.6 |
| 6,082,034 A | * | 7/2000 | Musmanno | F41C 33/001 42/94 |
| 6,186,693 B1 | * | 2/2001 | Cloyd | B60D 1/06 280/511 |
| 6,354,564 B1 | * | 3/2002 | Van Scyoc | F16L 37/32 137/614.04 |
| 6,540,426 B2 | * | 4/2003 | Cloyd | B60D 1/06 280/511 |
| 6,629,335 B1 | * | 10/2003 | Derman | E05C 17/52 16/82 |
| 6,802,275 B2 | * | 10/2004 | Schmidt | F16C 11/0604 114/361 |
| 7,841,122 B1 | * | 11/2010 | Hansen | F41A 23/08 42/94 |
| 7,938,456 B2 | * | 5/2011 | Chambaud | F16L 37/23 285/316 |
| 9,121,665 B2 | * | 9/2015 | Hinds | F41A 23/10 |
| 9,222,501 B2 | * | 12/2015 | Argillier | F16B 21/086 |
| 9,455,076 B2 | * | 9/2016 | Cascolan | H01F 7/124 |
| 10,139,183 B1 | * | 11/2018 | Liu | F41A 23/10 |
| 10,161,706 B2 | * | 12/2018 | Roberts | F41A 23/10 |
| 10,254,069 B2 | * | 4/2019 | Palu | F41A 23/10 |
| 2005/0249549 A1 | * | 11/2005 | Miyahara | F16B 21/075 403/275 |
| 2006/0278797 A1 | * | 12/2006 | Keng | F41A 23/54 248/440.1 |
| 2007/0003362 A1 | * | 1/2007 | Parent | E05F 5/06 403/122 |
| 2008/0295379 A1 | * | 12/2008 | Potterfield | F41A 23/10 42/94 |
| 2009/0126250 A1 | * | 5/2009 | Keng | F41A 23/10 42/94 |
| 2009/0285625 A1 | * | 11/2009 | Reasoner | F16G 11/10 403/14 |
| 2010/0029145 A1 | * | 2/2010 | Balsells | H01R 24/58 439/827 |
| 2012/0266513 A1 | * | 10/2012 | Gnesda | F41C 23/12 42/72 |
| 2013/0149029 A1 | * | 6/2013 | Changsrivong | H01R 24/58 403/361 |
| 2015/0241160 A1 | * | 8/2015 | McGinty | F41A 23/10 42/94 |
| 2016/0273863 A1 | * | 9/2016 | Hayes | F41A 23/10 |
| 2016/0312822 A1 | * | 10/2016 | Hermansson | F16C 1/108 |
| 2017/0089659 A1 | * | 3/2017 | Almond | F41C 23/16 |
| 2017/0291052 A1 | * | 10/2017 | Guardiano | F16L 5/04 |
| 2017/0321986 A1 | * | 11/2017 | Elsner | F41A 25/22 |
| 2018/0058795 A1 | * | 3/2018 | Scott | F41A 23/06 |
| 2018/0202746 A1 | * | 7/2018 | Flood, Jr. | F41A 23/10 |
| 2020/0300573 A1 | * | 9/2020 | Barnett | F41A 23/10 |
| 2020/0384494 A1 | * | 12/2020 | Miller | B05B 15/654 |
| 2020/0386260 A1 | * | 12/2020 | Marchant, Jr. | F16C 11/0604 |

\* cited by examiner

MODULAR QUICK-CHANGE SHOOTING PLATFORM FEET

RELATED APPLICATION

This application claims priority to U.S. Provisional Patent Application No. 62/817,252, filed Mar. 12, 2019, and incorporates the same herein by reference.

TECHNICAL FIELD

This invention relates to quickly changed feet for a shooting platform. More specifically, it relates to interchangeable feet usable on different types of firearm bipods or monopods.

BACKGROUND

Precision marksmanship often relies on a solid platform from which to launch the projectile. Often, collapsible platforms composed of one or more legs are affixed to the bottom of a firearm, air gun, or similar device so it may rest on solid ground while the shooter aligns the shot. Most of these devices are fitted with removable tips at the ends of the legs, which may be designed to function best for a given environment (for example, sharp spikes to dig into soft materials, broad feet to avoid sinking in mud, rubber feet to maintain friction against hard surfaces). Today, many popular shooting competitions involve moving between stages featuring a diverse array of surfaces, which makes it more difficult for a shooter to choose an equipment configuration suitable for all of them. Current foot options cannot be so rapidly changed between competition stages, and many common designs require tools to replace.

SUMMARY OF THE INVENTION

The present invention allows the marksman to quickly and easily swap out the feet on their shooting platform, so it may be quickly reconfigured for a wide variety of terrain conditions and shooting applications.

Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWINGS

Like reference numerals are used to indicate like parts throughout the various drawing figures, wherein.

DETAILED DESCRIPTION

Figure 1:
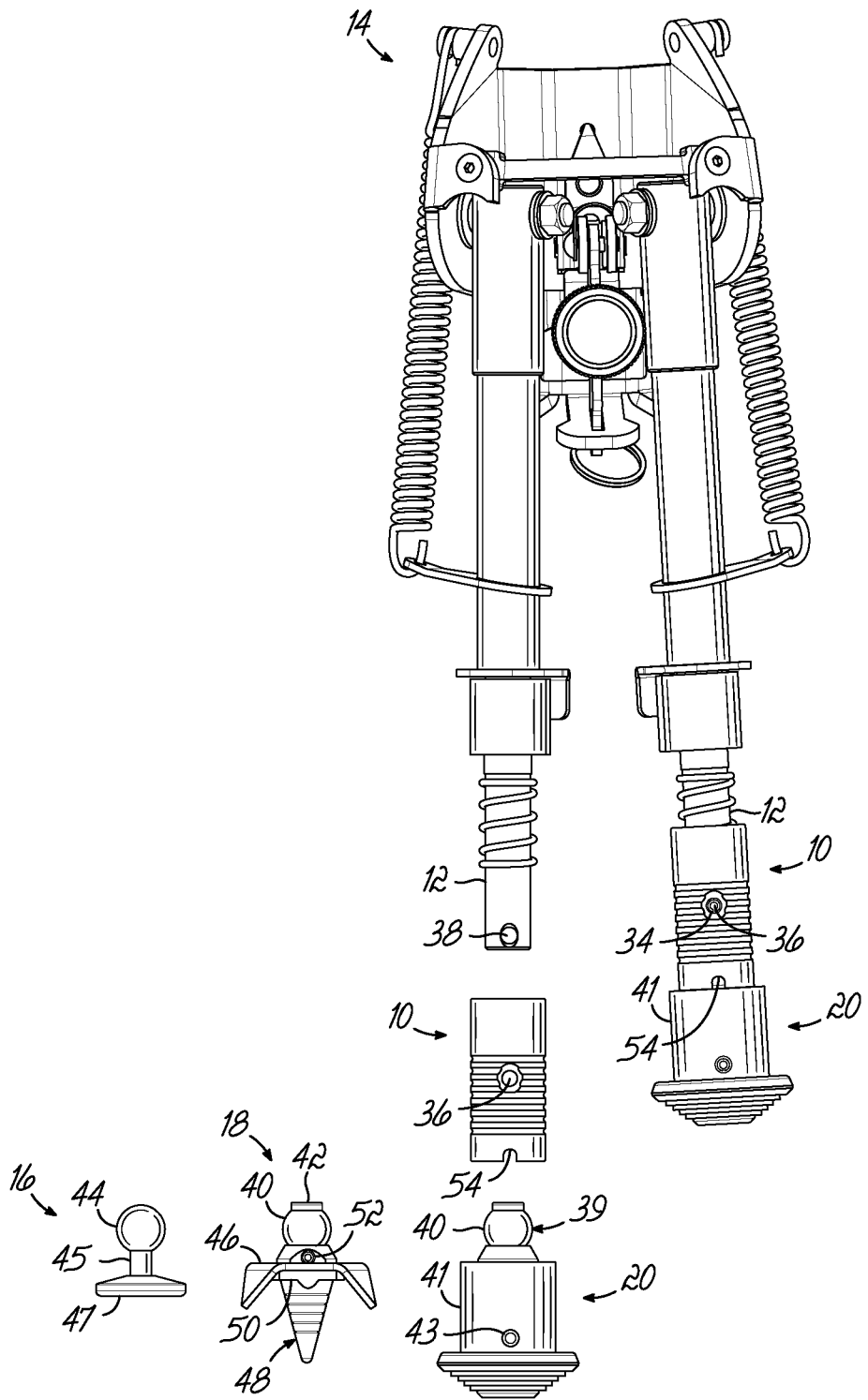
FIG. 1 is a pictorial view of a popular-style bipod is the folded position, partially exploded to show assembly and alternate feet types according to one embodiment of the invention.

With reference to the drawing figures, this section describes particular embodiments and their detailed construction and operation. Throughout the specification, reference to "one embodiment," "an embodiment," or "some embodiments" means that a particular described feature, structure, or characteristic may be included in at least one embodiment. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments. "Forward" will indicate the direction of the muzzle and the direction in which projectiles are fired, while "rearward" will indicate the opposite direction. "Lateral" or "transverse" indicates a side-to-side direction generally perpendicular to the axis of the barrel. Although firearms may be used in any orientation, "left" and "right" will generally indicate the sides according to the user's orientation, "top" or "up" will be the upward direction when the firearm is gripped in the ordinary manner.

As used herein, "firearm" includes a rifle, shotgun, or handgun, as well as air gun versions of the same, or a crossbow. "Shooting platform" refers to various devices used to support and stabilize a firearm, and which includes one or more legs. This includes, for example, monopods, bipods, and tripods. The device may or may not be attached directly to the firearm. "Leg" refers to the portion of the shooting platform that extends away from the firearm and supports it against the ground or other support surfaces. It may or may not be attached directly to the firearm. "Foot" refers to the tip affixed at the end of the shooting platform leg that contacts the ground or other support surfaces.

Referring first to FIG. 1, the invention includes an adapter socket 10 that attaches to the end of a leg 12 of a common shooting platform (such as a bipod 14) in a semi-permanent manner similar to the factory-supplied foot. According to the invention, a series of interchangeable feet 16, 18, 20 may be installed into the socket 10 without tools and retained firmly so they may be used to support the shooting platform 14. Modifications of the adapter socket 10 may be necessary to fit some types of shooting platform legs 12. However, it is intended that any selected style of foot 16, 18, 20 will fit the adapter socket 10.

The adapter sockets 10 are installed on their respective shooting platform's legs 12 in a similar manner to the factory-installed feet. The socket adapter 10 may attach to the leg without modification of the leg, so that the factory-supplied feet can be reused once removed, allowing the user to easily return to a configuration similar to factory specifications.

Figure 2:
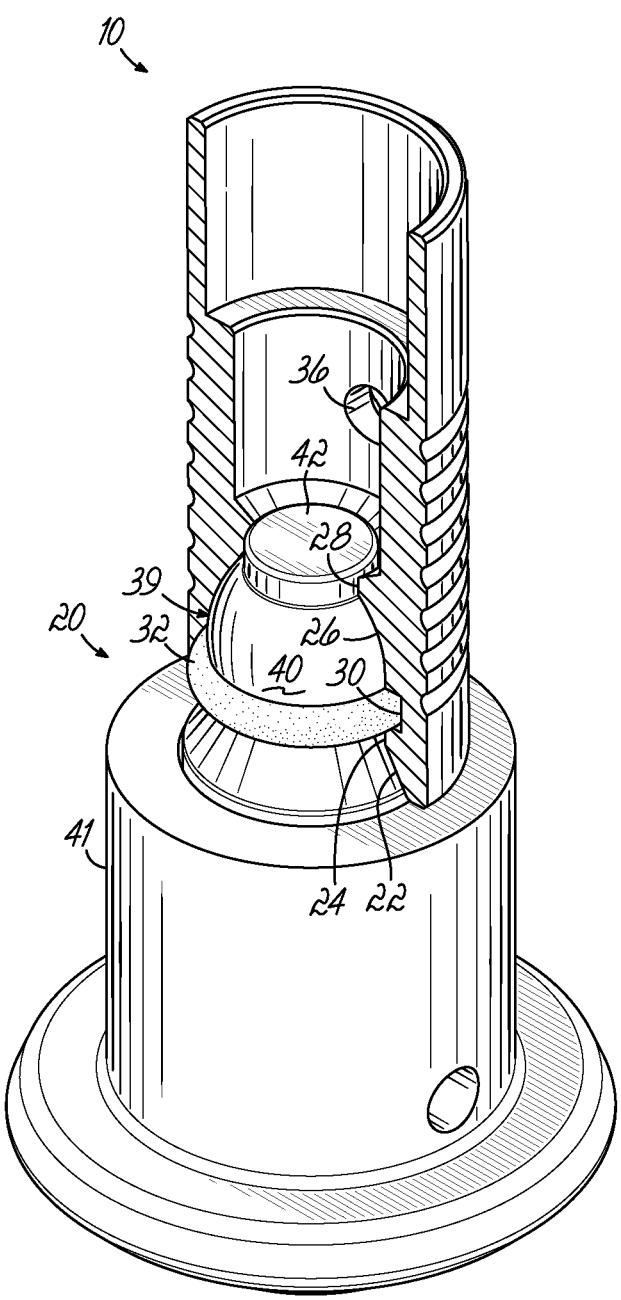
FIG. 2 is a partially cut-away isometric view of a leg adapter socket, foot adapter, and foot according to one embodiment of the invention.
Figure 3:
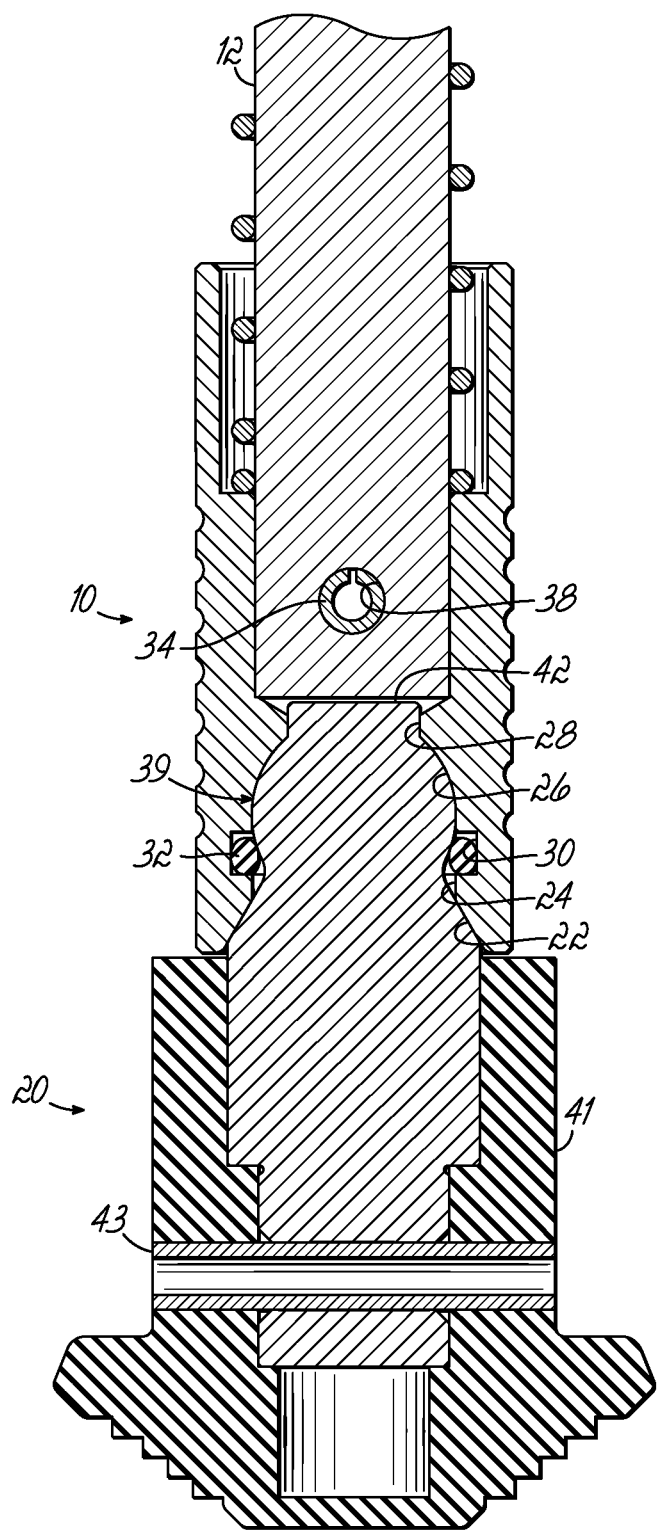
FIG. 3 is a side sectional view thereof.
Figure 4:
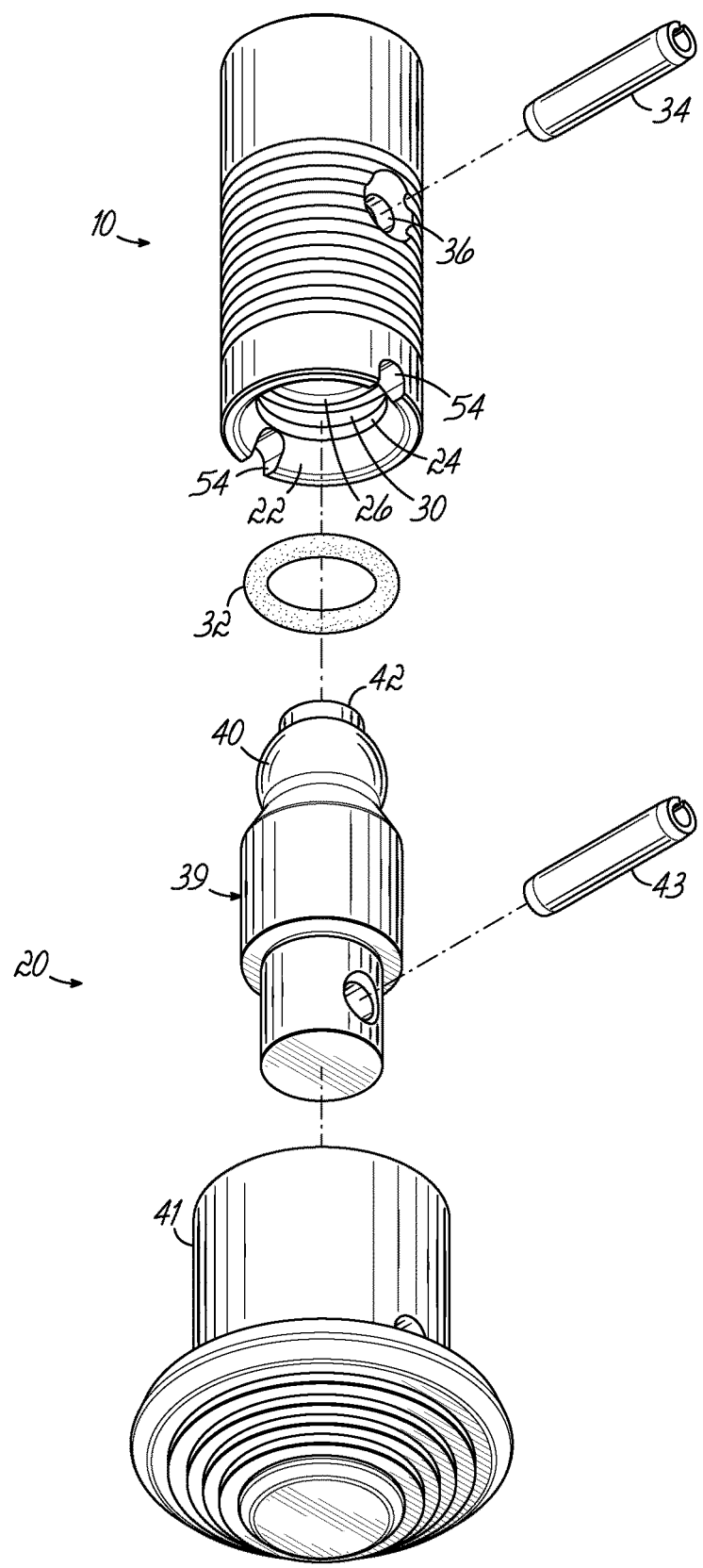
FIG. 4 is an isometric exploded view thereof.
Figure 7:
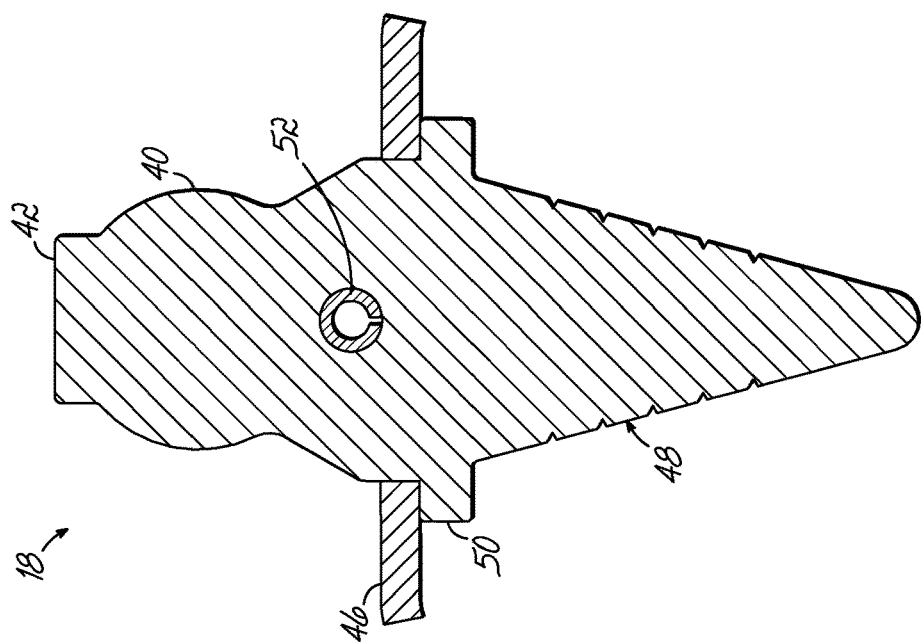
FIG. 7 is a side sectional view thereof.
Figure 6:
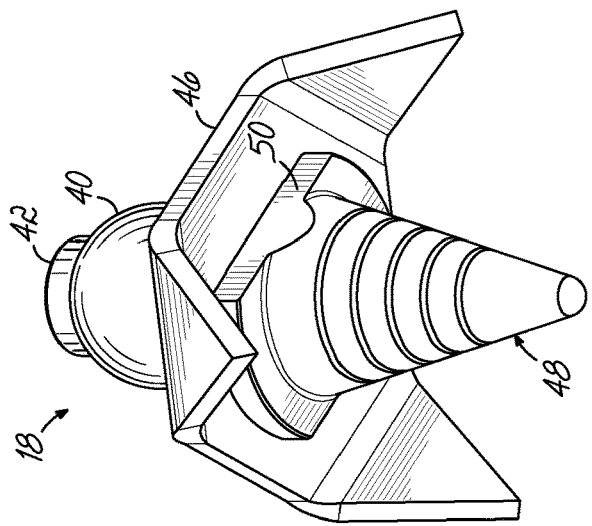
FIG. 6 is a second isometric view thereof.
Figure 5:
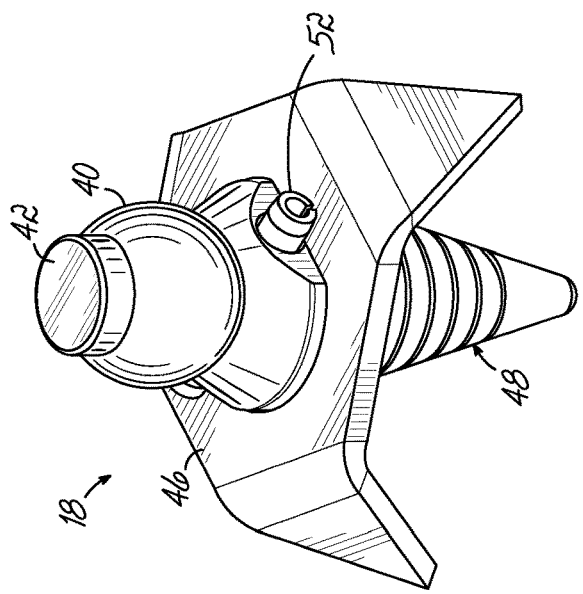
FIG. 5 is a first isometric view of an alternate foot type.

Referring now also to FIGS. 2-4, the socket 10 includes a tapered conical interior surface 22, a cylindrical transition 24 to a spherical socket surface 26, and a smaller cylindrical opening 28 at the opposite end of the spherical region 26. An undercut groove 30 is situated between the spherical and conical areas to receive an O-ring 32. At the opposite end of the adapter socket 10 are features that allow the adapter to fit onto the desired geometry of the leg 12 and attach solidly in a manner similar to the factory-supplied foot. For example, a roll pin 34 may be inserted through aligned transverse openings 36, 38 in the socket adapter 10 and leg 12.

The foot 20 may include a foot adapter body 39 to which a factory-supplied foot member 41, originally connected directly to the leg 12, may be attached to the socket adapter 10. The factory foot member 41 may be a rubber or other elastomeric material cap, as illustrated, or may be any other type of member that attached directly to the leg. Thus, the foot adapter body replicates the end of the leg 12 and connect to the foot member 41 at one end, such as with a cross-pin 43, and provides the quick connect features of the spherical surface 40 at the opposite end to releasably engage with the adapter socket 10.

The detachable feet 16, 18, 20 may be divided into two categories: articulating and non-articulating. Non-articulating feet 18, 20 mostly mirror the interior profile of the socket adapter 10 and have an extended spherical (ball-shaped) surface 40 that provides a surface for the O-ring 32 to grip, holding the foot 18, 20 solidly in the socket 10 against the conical taper 22. These feet 18, 20 also feature a protrusion in the form of a small cylindrical boss 42 at the tip of the spherical section 40, which fits into the matching feature 28 of the socket adapter 10. These provide increased resistance to off-axis torque about the sphere.

Figure 8:
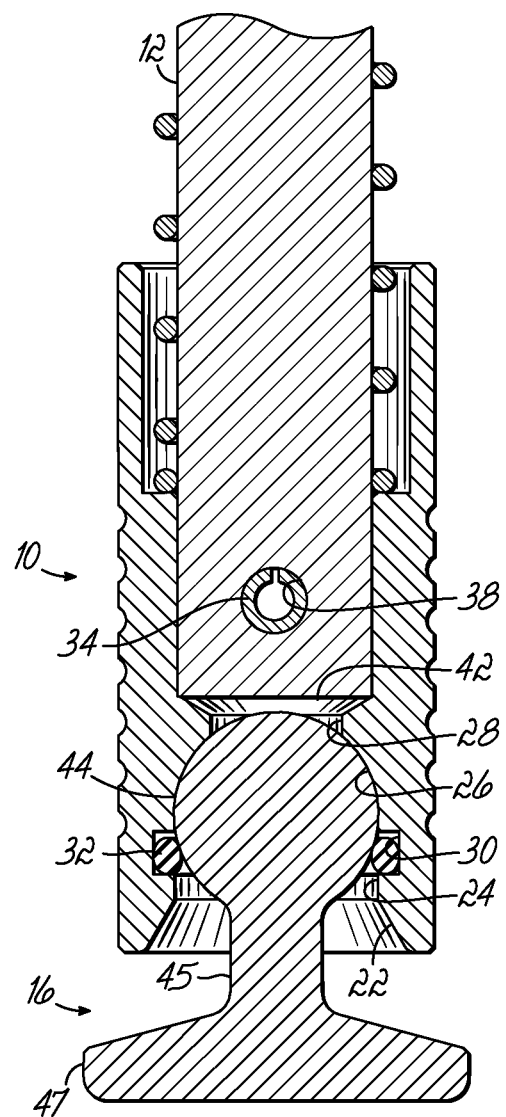
FIG. 8 is a side sectional view showing a portion of support leg, a leg adapter, and a swivel foot according to another embodiment of the invention.

Referring to FIGS. 1 and 8, articulating feet 16 may include a simple spherical or ball-shaped head 44 with a stem 45 that extends to a foot contact surface 47. Lacking the conical taper or cylindrical boss, they are free to pivot about the spherical section while still retained by the O-ring tension.

Either type of feet 16, 18, 20 (articulated or nonarticulated) may also have "baskets" 46 installed on them, which can be flat or formed sheet pieces that broaden the contact area and/or provide additional contact points. In the illustrated embodiment shown in FIGS. 1 and 5-7, these slide over the ends of a foot body 48 against a wider shoulder 50 and are retained by a cross pin 52. The opening in the basket piece 46 may be non-round so that it cannot rotate relative to the foot body 46, if desired. For some non-articulating feet, this cross pin 52 may be positioned such that the extended ends fit into notches 54 in the socket adapter 10, preventing the foot 18 from spinning axially once installed.

The user installs and removes the feet 16, 18, 20 simply by pushing them into or pulling them from the socket adapter 10 along their axis. Doing so forces the spherical portion 40 of the foot through the smaller diameter O-ring 32, stretching or temporarily deforming it until the foot 16, 18, 20 is fully seated or removed. The O-ring 32 size can be chosen, for example, such that it will provide about 15 pounds of axial resistance, which is high enough to reliably hold the foot even when handled during shooting, but low enough to remain easily removed by hand.

Once installed by pressing them fully into the recess of the adapter socket 10, the feet 16, 18, 20 may be used as they would be if they had been attached by the typical means of direct attachment to the legs 12, such as driven-pins or threaded attachment. The non-articulating feet 16, 18 will function as rigid tips to the legs, while the articulating feet 20 will be able to freely pivot to conform to uneven support surfaces.

The illustrated embodiment has a cylindrical outer shape and may carry some decorative external grooves and/or logo marking. The material used for most of the parts may be aluminum, which is anodized for durability and color. The adapters 10 and feet 16, 18, 20 are designed to be as compact as possible, to minimize the addition of length, weight, and bulk to the shooting platform While one or more embodiments of the present invention have been described in detail, it should be apparent that modifications and variations thereto are possible, all of which fall within the true spirit and scope of the invention. Therefore, the foregoing is intended only to be illustrative of the principles of the invention. Further, since numerous modifications and changes will readily occur to those skilled in the art, it is not intended to limit the invention to the exact construction and operation shown and described. Accordingly, all suitable modifications and equivalents may be included and considered to fall within the scope of the invention, defined by the following claim or claims.

What is claimed is:

1. A foot attachment adapter for a firearm support device having at least one leg, the adapter comprising:
   a body configured to attach to a leg of a firearm support device and including a primary socket having a portion with substantially spherical interior walls and a secondary socket extending into the body therefrom;
   a foot having an attachment portion configured to be detachably received by at least the primary socket, the attachment portion selectively including one of either a substantially spherical ball surface without any additional projection such that the foot is angularly pivotable when inserted into the body or a substantially spherical ball surface with a projection configured to extend into the secondary socket such that the foot is not angularly pivotable when installed into the body;
   a temporarily deformable elastomeric member positioned at least partially in the primary socket configured to allow insertion of the substantially spherical ball surface of either foot attachment portion and to releasably hold the attachment portion in the primary socket,
   wherein the body interchangeably receives either type of foot attachment portion so that the foot is either angularly pivotable or not angularly pivotable relative to the body.

2. The adapter of claim 1, wherein the primary socket includes an annular internal channel and the elastomeric member includes an o-ring received in the annular internal channel.

* * * * *